US012591036B2

(12) United States Patent
Vollbracht et al.

(10) Patent No.: US 12,591,036 B2
(45) Date of Patent: Mar. 31, 2026

(54) RADAR SENSOR FOR A VEHICLE AND METHOD FOR INTEGRATING A RADAR SENSOR IN A VEHICLE

(71) Applicant: Aptiv Technologies AG, Schaffhausen (CH)

(72) Inventors: Dennis Vollbracht, Hilden (DE); Mathias Busch, Wuppertal (DE); Jairo Escudero Torres, Cologne (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 264 days.

(21) Appl. No.: 18/374,861

(22) Filed: Sep. 29, 2023

(65) Prior Publication Data

US 2024/0111018 A1 Apr. 4, 2024

(30) Foreign Application Priority Data

Sep. 30, 2022 (EP) ..................................... 22199026

(51) Int. Cl.
*G01S 7/03* (2006.01)
*G01S 13/931* (2020.01)

(52) U.S. Cl.
CPC ............ *G01S 7/032* (2013.01); *G01S 13/931* (2013.01); *G01S 2013/93274* (2020.01); *G01S 2013/93275* (2020.01)

(58) Field of Classification Search
CPC ................... G01S 7/032; G01S 13/931; G01S 2013/93275; G01S 2013/93274
USPC ......................................................... 342/70
See application file for complete search history.

(56) References Cited

U.S. PATENT DOCUMENTS

| | | | |
|---|---|---|---|
| 7,151,479 B2 * | 12/2006 | Beez ..................... | H01Q 1/3233 342/174 |
| 8,816,900 B2 * | 8/2014 | Hasegawa ............... | G01S 13/34 342/194 |
| 8,974,712 B2 * | 3/2015 | Ohtake .................... | H01Q 1/42 264/255 |
| 9,524,597 B2 * | 12/2016 | Ricci .................. | G06Q 30/0645 |
| 9,653,796 B2 * | 5/2017 | Pleva ........................ | H01Q 1/52 |

(Continued)

FOREIGN PATENT DOCUMENTS

| | | | | |
|---|---|---|---|---|
| CN | 112389053 A | 2/2021 | | |
| EP | 2966466 A2 * | 1/2016 | .......... | G01S 13/931 |
| EP | 3758143 A1 * | 12/2020 | ............. | G06F 30/20 |

OTHER PUBLICATIONS

Search Report regarding European Patent Application No. 22199026.0, dated Mar. 13, 2023.

(Continued)

*Primary Examiner* — Nuzhat Pervin
(74) *Attorney, Agent, or Firm* — Harness, Dickey & Pierce, P.L.C.

(57) ABSTRACT

A radar sensor comprises a radar transmit and receive unit configured to transmit radar waves to an external environment of the vehicle and to receive radar waves from the external environment of the vehicle, and an interface unit attached to the radar transmit and receive unit. One or more design and/or material parameters of the interface unit are adjusted to fit a predetermined installation position at the vehicle with respect to desired characteristics of the transmitted and received radar waves. A corresponding method for integrating a radar sensor in a vehicle is also disclosed.

13 Claims, 8 Drawing Sheets

(56) References Cited

U.S. PATENT DOCUMENTS

Figure 1:
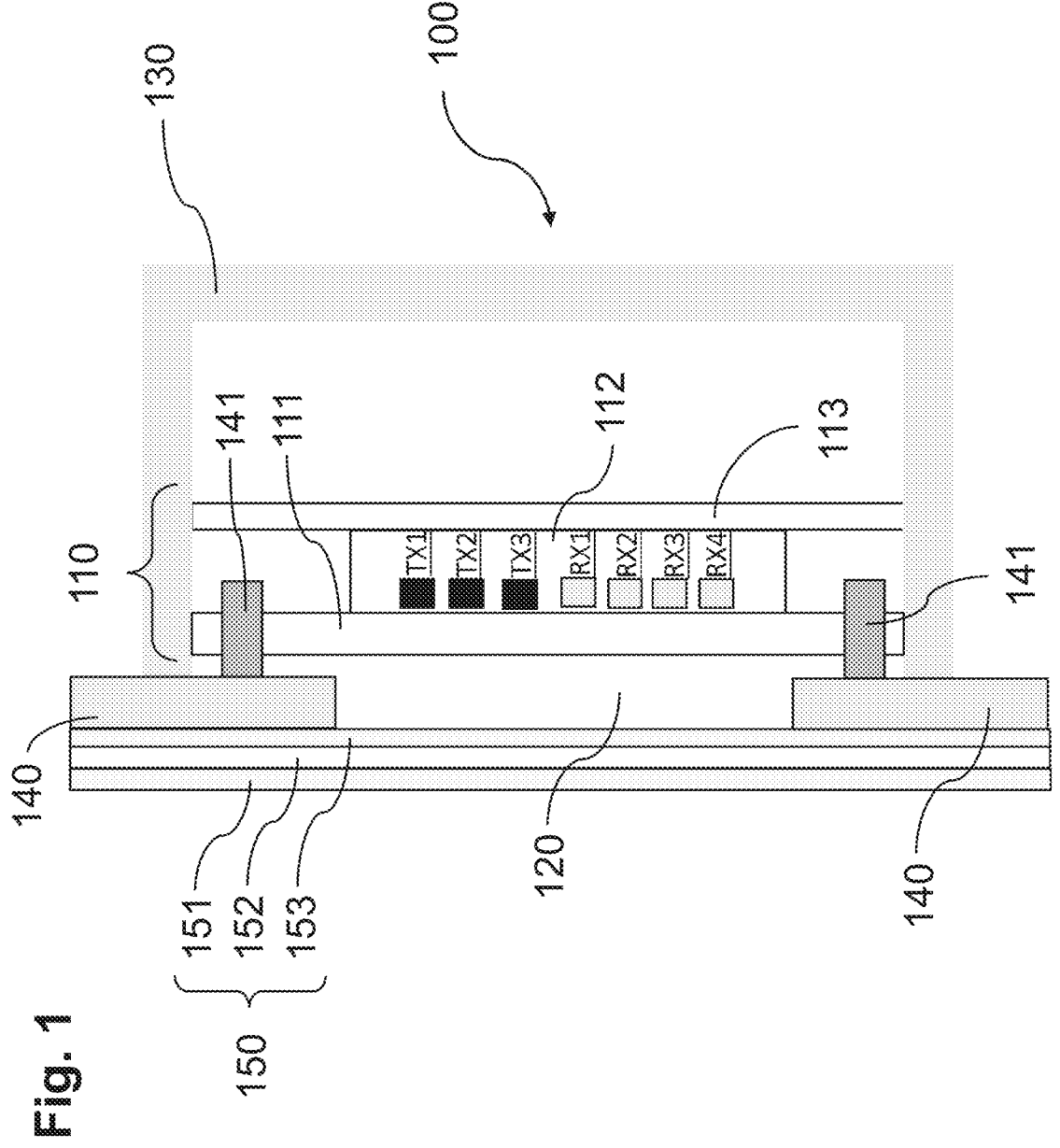

| | | | | |
|---|---|---|---|---|
| 9,812,787 | B2 * | 11/2017 | Binzer | H01Q 1/422 |
| 10,048,369 | B2 * | 8/2018 | Aoki | G01S 7/032 |
| 10,328,853 | B2 * | 6/2019 | Yellambalase | B60L 3/0023 |
| 10,399,445 | B2 * | 9/2019 | Yellambalase | B60L 53/16 |
| 10,471,829 | B2 * | 11/2019 | Yellambalase | B60L 3/0046 |
| 10,585,170 | B2 * | 3/2020 | Hellinger | G01S 7/4026 |
| 10,794,995 | B2 * | 10/2020 | Park | G01S 7/4026 |
| 11,009,588 | B2 * | 5/2021 | Park | G01S 7/4021 |
| 11,137,478 | B2 * | 10/2021 | Park | G01S 13/931 |
| 11,151,447 | B1 * | 10/2021 | Chen | G01S 13/931 |
| 11,340,354 | B2 * | 5/2022 | Lin | G01S 13/867 |
| 11,494,598 | B2 * | 11/2022 | Kim | H04N 23/45 |
| 11,733,365 | B2 * | 8/2023 | Mayer | G01S 13/87 |
| | | | | 342/200 |
| 11,768,270 | B2 * | 9/2023 | Cho | G01S 7/4026 |
| | | | | 342/165 |
| 11,815,623 | B2 * | 11/2023 | Deng | G01S 7/41 |
| 11,977,142 | B2 * | 5/2024 | Homma | G01S 7/35 |
| 12,248,063 | B2 * | 3/2025 | Kawaji | G01S 13/32 |
| 2014/0091969 | A1 * | 4/2014 | Shi | G01S 13/02 |
| | | | | 342/385 |
| 2017/0212215 | A1 * | 7/2017 | Hellinger | G01S 13/931 |
| 2019/0212437 | A1 * | 7/2019 | Mayer | B60Q 1/0023 |
| 2019/0285729 | A1 * | 9/2019 | Tietze | G01S 7/4026 |
| 2019/0295282 | A1 * | 9/2019 | Smolyanskiy | G06N 3/0495 |
| 2019/0302227 | A1 * | 10/2019 | Shiozaki | H01Q 21/0075 |
| 2020/0278436 | A1 * | 9/2020 | Mayer | G01S 13/87 |
| 2020/0358207 | A1 * | 11/2020 | Baur | H01Q 21/0075 |
| 2020/0363499 | A1 * | 11/2020 | Mayer | G01S 13/87 |
| 2021/0063528 | A1 * | 3/2021 | Mayer | G01S 13/003 |
| 2021/0132215 | A1 * | 5/2021 | Wu | G01S 13/931 |
| 2021/0165070 | A1 * | 6/2021 | Mayer | G01S 7/003 |
| 2021/0190961 | A1 * | 6/2021 | Li | G06F 30/15 |
| 2021/0349200 | A1 * | 11/2021 | Homma | G01S 7/40 |
| 2021/0374308 | A1 * | 12/2021 | Jung | G06F 30/15 |
| 2022/0013885 | A1 * | 1/2022 | Yang | B60R 19/483 |
| 2023/0161026 | A1 * | 5/2023 | Grebner | G01S 15/931 |
| | | | | 342/113 |
| 2023/0273297 | A1 * | 8/2023 | Bai | G01S 7/03 |
| | | | | 342/200 |
| 2023/0314601 | A1 * | 10/2023 | Grard | G01S 7/027 |
| | | | | 342/70 |
| 2024/0012137 | A1 * | 1/2024 | Albou | H01Q 1/3291 |
| 2024/0385284 | A1 * | 11/2024 | Renaud | G01S 7/03 |

OTHER PUBLICATIONS

In the Future Your Entire Car Could Be a Radar Antenna, Says IDTechEx, IDTechEx, <https://www.idtechex.com/en/research-article/in-the-future-your-entire-car-could-be-a-radar-antenna-says-idtechex/26046>, Mar. 1, 2022.

* cited by examiner

$\varepsilon_{r_2}$ $\varepsilon_{r_1}$ $\varepsilon_{r_3}$

| | th [μm] | ε_r | tanδ |
|---|---|---|---|
| 151 | 20 | 7 | 0.05 |
| 152 | 15 | 45 | 0.015 |
| 153 | 30 | 3.5 | 0.01 |

600

602

Determine a desired installation position of a radar sensor at a vehicle

604

Adapt one or more design and/or material parameters of an interface unit to the desired installation position with respect to desired characteristics of transmitted and received radar waves

Fig. 7

Radar sensor integration system

700

Installation position determination circuit

702

705

Adaptation circuit

704

RADAR SENSOR FOR A VEHICLE AND METHOD FOR INTEGRATING A RADAR SENSOR IN A VEHICLE

CROSS-REFERENCE TO RELATED APPLICATIONS

This application claims priority to European Patent Application No. 22199026.0, filed Sep. 30, 2022. The entire disclosure of the above application is incorporated herein by reference.

FIELD

The present disclosure relates to a radar sensor for a vehicle and to a method for integrating a radar sensor in a vehicle.

BACKGROUND

When integrating a radar system in a vehicle, a radar sensor of such a system is usually located behind plastic composite parts of the vehicle. Such plastic parts include a fascia of the vehicle, for example, if the radar sensor is to be located in a front part of the vehicle. As an alternative, a radar sensor may be implemented visibly in an opening or cutout of the vehicle body. For both cases, the number of positions is restricted at which the radar sensor can be installed in or at the vehicle.

If the radar sensor is located e.g. behind the fascia of the vehicle, the impact of the fascia on the radar sensor may be evaluated by simulating transmitted and received radar waves in order to determine the best position for the radar sensor. However, due to the positioning behind the fascia, the attenuation of the transmitted and received radar waves is high since the waves have usually to pass through a radome of the radar sensor and through the fascia. Therefore, a loss of 1 to 5 dB may occur, for example, such that the performance of the radar sensor is degraded significantly. The radar performance refers to the field of view and the maximum range available for the radar sensor and to the ability to perform angle finding.

In contrast, if the radar sensor is implemented visibly in an opening or cutout of an outer surface of the vehicle, a degradation of the radar performance may be prevented. However, in this case the number of positions for such an installation may be also strongly restricted due to further vehicle requirements.

Furthermore, the body or outer shell of the vehicle mostly requires conformal structures which may also limit the number of installation positions being available for a radar sensor. For example, the requirement of conformal structures may prevent providing an opening or cutout at desired installation positions of the radar sensor. Moreover, the aesthetic appearance of the vehicle may be deteriorated by the opening or cutout being visible in the vehicle body. Hence, radar sensors are usually hidden behind plastic parts of the vehicle, which is accompanied by the attenuation problems as described before.

Accordingly, there is a need to provide a radar sensor and a method for integrating the radar sensor in a vehicle which allow for a flexible positioning of the radar sensor without deteriorating the performance of the radar sensor.

SUMMARY

The present disclosure provides a radar sensor, computer implemented method, a computer system and a non-transitory computer readable medium according to the independent claims. Embodiments are given in the subclaims, the description and the drawings.

In one aspect, the present disclosure is directed at a radar sensor for a vehicle. The radar sensor comprises a radar transmit and receive unit configured to transmit radar waves to an external environment of the vehicle and to receive radar waves from the external environment of the vehicle, and an interface unit attached to the radar transmit and receive unit. One or more parameters of the interface unit, e.g. design and/or material parameters, are adjusted to fit a predetermined installation position at the vehicle with respect to desired characteristics of the transmitted and received radar waves.

The term "radar waves" generally refers to electromagnetic waves that are transmitted and received by the radar sensor. The radar transmit and receive unit may include a plurality of radar transmit elements for transmitting the radar waves and a plurality of radar receive elements for receiving radar waves which are reflected at objects in the external environment of the vehicle. The radar transmit and receive unit may further include suitable antennas for transmitting and receiving the radar waves in a range of wavelengths being suitable for automotive applications.

The interface unit may be configured to perform an impedance matching for the radar transmit and receive unit, i.e. between radar transmit and receive antennas and an outer shell of the vehicle. In addition, the interface unit may be configured to perform a "pattern function" for the transmitted and received radar waves. That is, a shape, i.e. the geometry in three dimensions, and dielectric properties of the interface unit may be designed in such a manner that a desired pattern with respect to intensity and angle distribution of the transmitted and received radar waves may be achieved.

The desired characteristics of the transmitted and received radar waves to which the interface unit is designed for may therefore include the impedance matching and the pattern function properties. Due to this, a field of view, a maximum range and a correction capability for proper angle finding may be achieved accordingly by the design of the interface unit. In other words, the design and/or material parameters of the interface unit may be adjusted to desired antenna radiation characteristics of the radar transmit and receive unit and to the angle finding performance over azimuth and elevation angles. Therefore, the performance of the radar sensor may be improved for the predetermined installation position at the vehicle due to the aforementioned properties of the interface unit.

Due to the design flexibility of the interface unit, additional positions are available for the integration of the radar sensor which are not available for the radar integration performed in the conventional manner, e.g. by placing the radar sensor behind a fascia, behind a bumper or visibly in an opening of a vehicle body. In other words, the radar sensor may be aesthetically integrated due to an adjustment of the interface unit regarding its shape, wherein an integration in metal and plastic vehicle parts may be feasible. Hence, due to the adjustment of the interface unit, conformal and smooth outer structures of the vehicle may be achieved in which the radar sensor may be optically invisible from outside the vehicle. Moreover, due to the existence of the interface unit the radar sensor may be easily replaced in case of a malfunction.

In addition, the interface unit may replace a radome of the radar sensor and a portion of the fascia at the predetermined installation position. In other words, the interface unit may act as a radome and a fascia. Since the interface unit is attached to the radar transmit and receive unit, the usual distance between the radar sensor and the fascia is eliminated. Therefore, multiple reflections of the radar waves, e.g. at the fascia, may be avoided or at least strongly reduced. In summary, the radar sensor may be integrated more flexibly in the vehicle while the performance of the radar sensor is improved at the same time.

According to an embodiment, the one or more design and/or material parameters of the interface unit may be configured to provide a desired radiation pattern for the transmitted and received radar waves. That is, the shape and the dielectric properties of the interface unit may be designed such that the desired radiation pattern is achieved for the transmitted and received radar waves. The radiation pattern may also be denoted as antenna radiation pattern since it is mostly provided by antennas of the radar transmit and receive unit. As such, the interface unit may provide a further possibility for arranging the radiation pattern of the radar waves, i.e. in addition to an internal configuration of the radar transmit and receive unit, e.g. by an orientation and an alignment of the antennas.

The desired radiation pattern may include a coincidence of phase patterns associated with at least two elements of the radar transmit and receive unit. That is, according to the desired radiation pattern it may be requested to design the interface unit in such a manner that the coincidence of the phase patterns may be achieved for at least two elements of the radar transmit and receive unit, e.g. for corresponding antennas. By this means, the angle finding performance of the radar sensor may remain or may be improved.

The interface unit may include at least one layer, and a thickness and/or dielectric properties of each of the at least one layer may be adjusted to provide the desired radiation pattern for the transmitted and received radar waves. For the present embodiment, the thickness and the dielectric properties may therefore be the design and material parameters which are adjusted or tuned to the predetermined installation position at the vehicle with respect to desired characteristics of the transmitted and received radar waves. The dielectric properties which may be adjusted are the dielectric permittivity $\varepsilon_r$ or the dielectric loss $\tan \delta$ of the at least one layer, or both.

The interface unit may further include at least two layers, and each of these layers may have different dielectric properties, i.e. different from the dielectric properties of the other layers. The at least two layers may also include an interface layer which may be located between two other layers, and a shape, i.e. the geometrical design, and/or dielectric properties of the interface layer may be configured such that the desired radiation pattern for the transmitted and received radar waves may be provided. The shape or geometrical design of the interface layer may include at least one protrusion or at least one recess extending from or into one of the other two layers. Although three layers are considered in this embodiment, a greater number of layers may be provided including a respective interface layer between two other layers. Alternatively or additionally, the interface unit may include at least one cavity in order to provide the desired radiation pattern for the transmitted and received radar waves. The cavity may be filled with air or another material having other dielectric properties as the rest of the interface unit. Hence, due to the layers, the cavity and/or the internal dielectric structure of the interface unit, the design of the interface unit may be performed in a diligent and sensitive manner for the predetermined installation position of the radar sensor.

According to a further embodiment, a three-dimensional geometry, i.e. the spatial form or shape, of the interface unit may be adjusted to the desired installation position at the vehicle with respect to desired characteristics of the transmitted and received radar waves. This may be performed even in conformal outer shapes of the vehicle. In detail, an outer surface of the interface unit may be adjusted to an outer surface of the vehicle, e.g. of the vehicle body. For example, metal and/or plastic parts of the vehicle may be flush with the outer surface of the interface unit. Due to this spatial adjustment, the radar sensor may be optically invisible from outside the vehicle. Hence, the desired aesthetic appearance of the outer surface of the vehicle is ensured by such a spatial adjustment of the interface unit.

According to a further embodiment, the radar transmit and receive unit may include a printed circuit board including a plurality of molded antennas for transmitting and receiving radar waves, and the interface unit may be located adjacent to the printed circuit board. The molded antennas may be broadband antennas. The interface unit may be directly connected to the radar transmit and receive unit such that no gap or only a small gap is provided between the interface unit and the radar transmit and receive unit. Due to the small distance between the interface unit and the molded antennas, multiple reflections of the transmitted radar waves may be suppressed.

The radar transmit and receive unit may further include a chip or device for providing the transmission signals and the receive signals of the radar sensor, and a further board configured as a holder for the chip or device and the printed circuit board and to include further electric and electronic elements for operating the radar sensor. As such, the radar transmit and receive unit may have a modular structure which facilitates maintenance and repair of the radar sensor.

In another aspect, the present disclosure is directed at a vehicle comprising at least one radar sensor as described above. Hence, the benefits, the advantages and the disclosure for the radar sensor described above are also valid for the vehicle according to the disclosure.

The at least one radar sensor may be located in an opening at an outer surface of the vehicle. Hence, the outer surface of the interface unit may be adjusted to this outer surface of the vehicle in the area of the opening. The interface unit of the radar sensor may therefore replace a part of the fascia of the vehicle such that the radar sensor may be optically invisible when the vehicle is viewed from the outside.

Additionally or alternatively, the at least one radar sensor may be located behind a bumper of the vehicle. For this embodiment, the interface unit of the radar sensor may also be an interface between the bumper and molded antennas which may be provided within a printed circuit board of the radar transmit and receive unit. The shape of the interface unit, e.g. its surface facing away from the radar transmit and receive unit, may be adapted to an inner surface of the bumper such that the interface unit is fully covered by the bumper.

According to another embodiment, the vehicle may comprise at least one coating layer and at least one painting layer covering the interface unit. In detail, a primer layer may be provided on top of the interface unit, a paint layer may be applied on the primer layer, and a clear coat layer may be applied on the painting layer. The interface unit may be further adjusted to the respective spatial and dielectric characteristics of the at least one coating layer and of the at least one painting layer at the predetermined position of the radar sensor.

The spatial and dielectric characteristics may include the respective thickness and the dielectric permittivity Er of each layer. For these entities, a respective tolerance may be predefined in the design phase of the vehicle, and the interface unit may be designed and adjusted such that the desired characteristic of the transmitted and received radar waves are still achieved for the predefined tolerances defined with respect to the at least one coating layer and the at least one painting layer. As such, the coating and painting layers may not only be provided for achieving a smooth and aesthetic appearance of the outer surface of the vehicle, but also for achieving the required dielectric properties in connection with the interface unit.

In another aspect, the present disclosure is directed at a computer implemented method for integrating a radar sensor in a vehicle. The radar sensor includes a radar transmit and receive unit configured to transmit radar waves to an external environment of the vehicle and to receive radar waves from the external environment of the vehicle, and an interface unit being attached to the radar transmit and receive unit. According to the method, a desired installation position of the radar sensor at the vehicle is determined, and one or more design and/or material parameters of the interface unit are adjusted to fit the desired installation position with respect to desired characteristics of the transmitted and received radar waves. As such, the method performs the adjustment of the interface unit of the radar sensor to the installation position which is determined in a preceding method step. Therefore, the benefits, the advantages and the disclosure of the radar sensor and the vehicle as described above are also valid for the computer implemented method.

Determining the desired installation position of the radar sensor may include the steps of receiving data associated with a geometrical shape of the vehicle, simulating the transmitted radar waves for a plurality of candidate positions at the vehicle based on the received data, and selecting one of the candidate positions as the desired installation position for which a deviation between a radiation pattern of the simulated transmitted radar waves and a desired radiation pattern is minimized. In other words, an optimization process is performed to find the best position for the radar sensor at the vehicle. The data associated with the geometrical shape of the vehicle may include CAD data of the vehicle which are generated during a design phase of the vehicle.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid-state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Exemplary embodiments and functions of the present disclosure are described herein in conjunction with the following drawings, showing schematically:

FIG. 1 depicts a radar sensor integrated in a vehicle according to the disclosure, FIGS. 2A to 2C depict different configurations of an interface unit for the radar sensor as shown in FIG. 1

Figures 3, 3A, 3B:
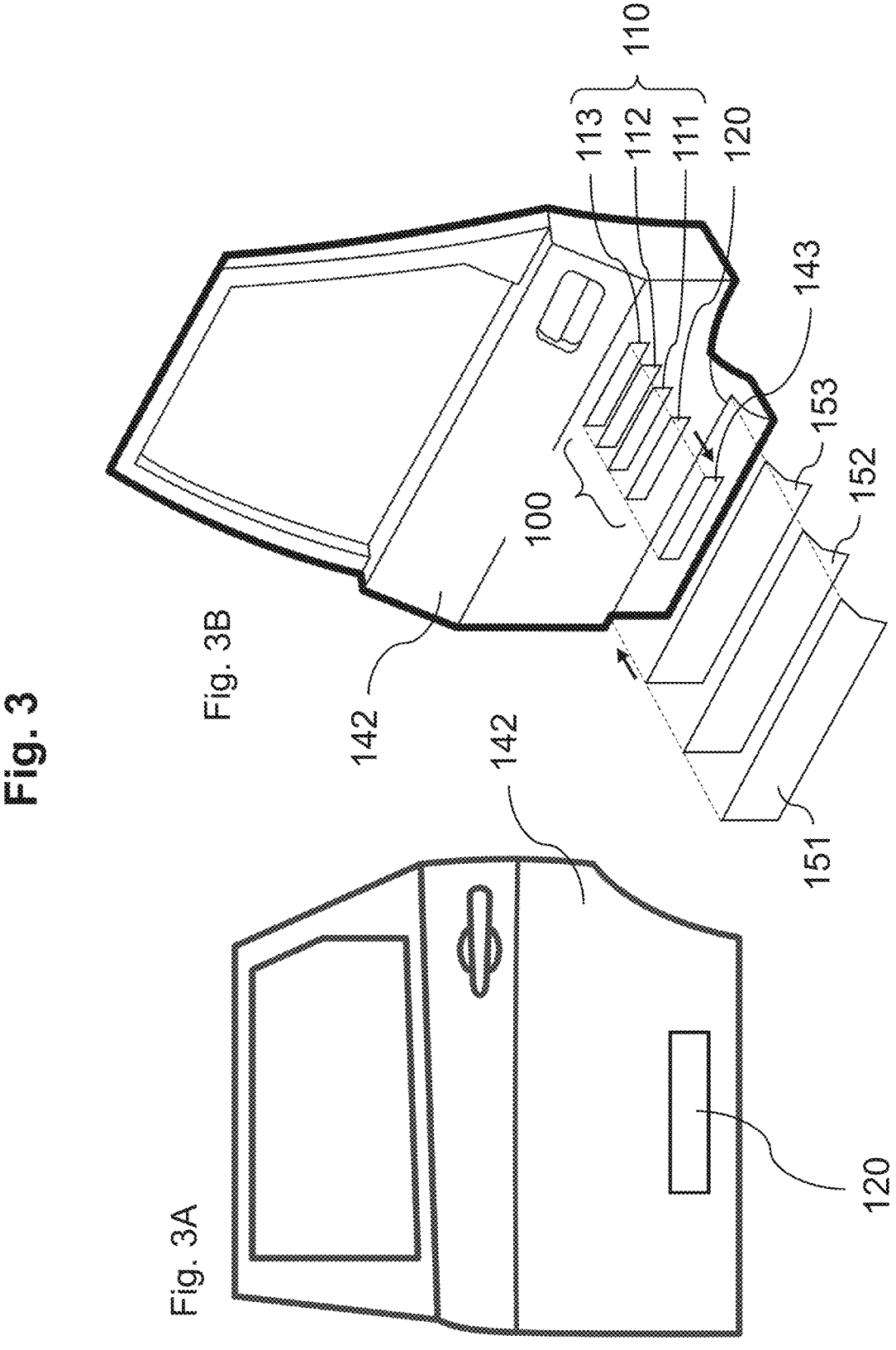
Figure 4:
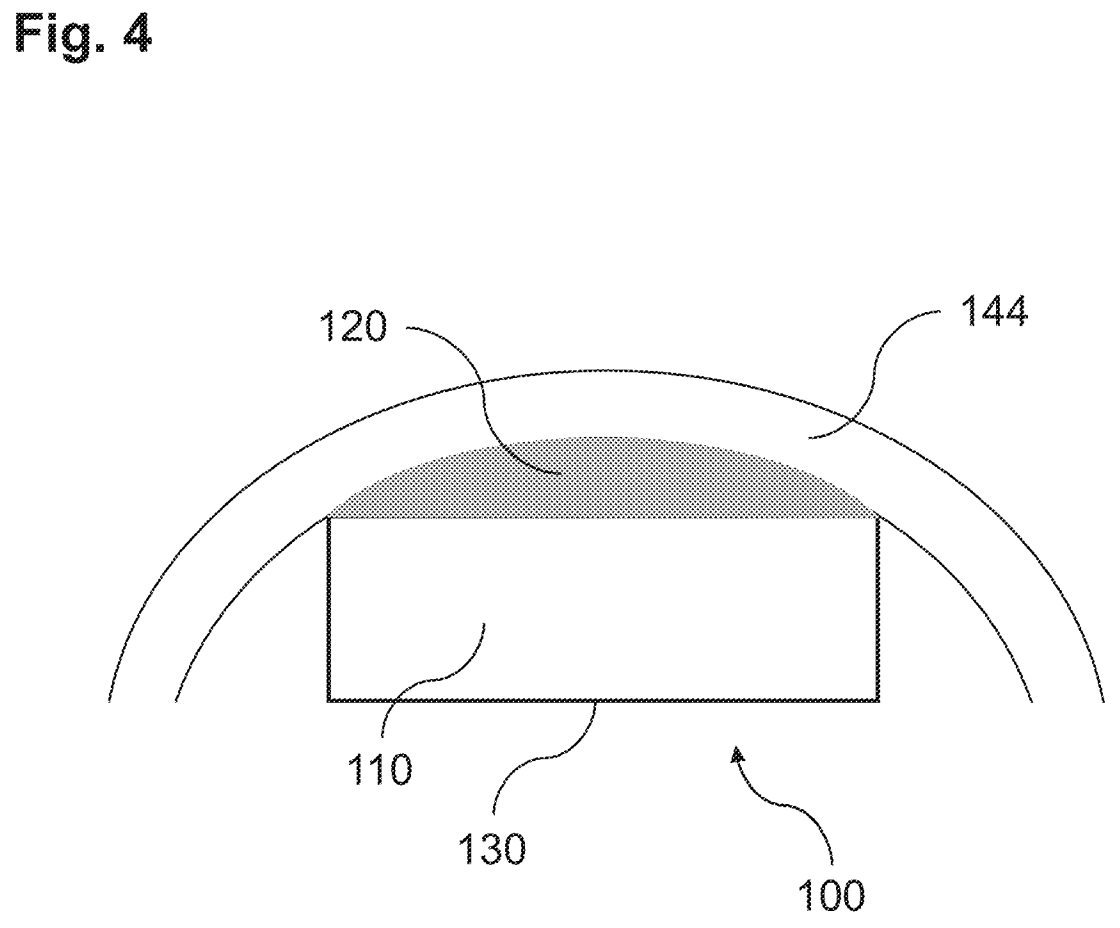
Figure 5:
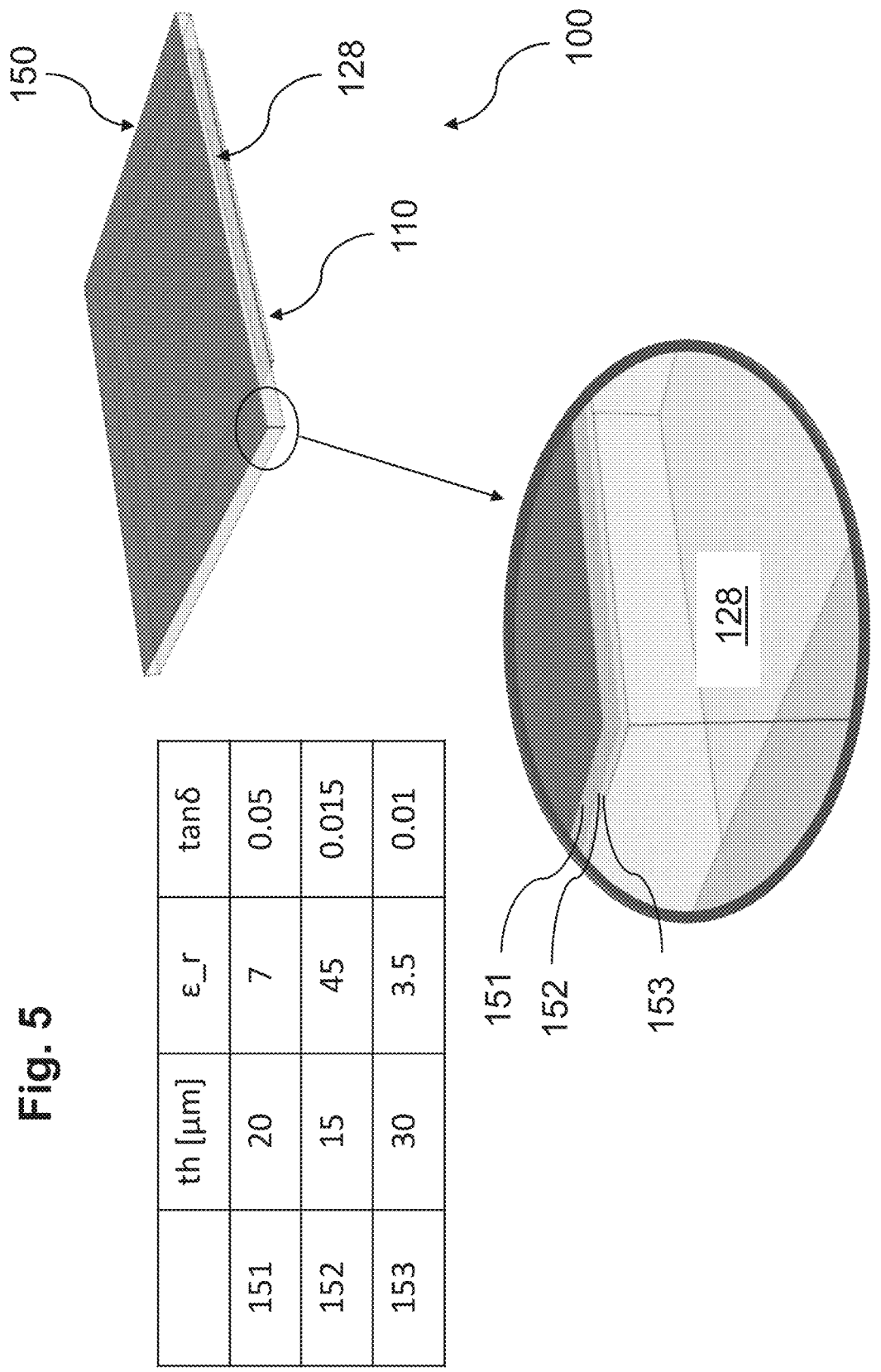
Figure 6:
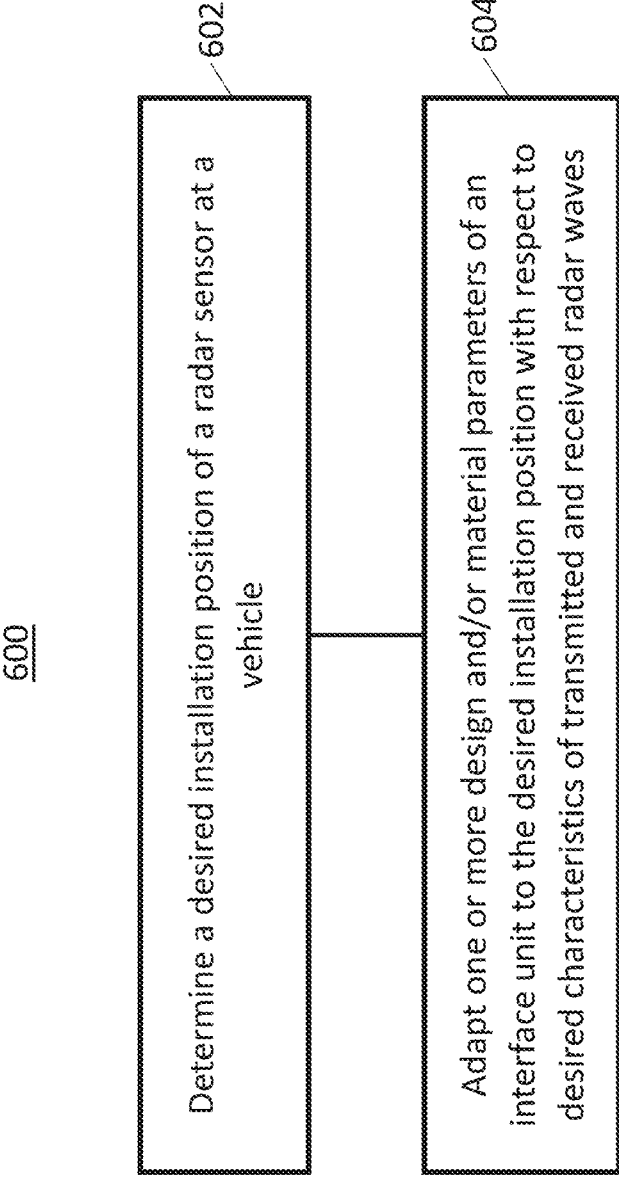
Figure 7:
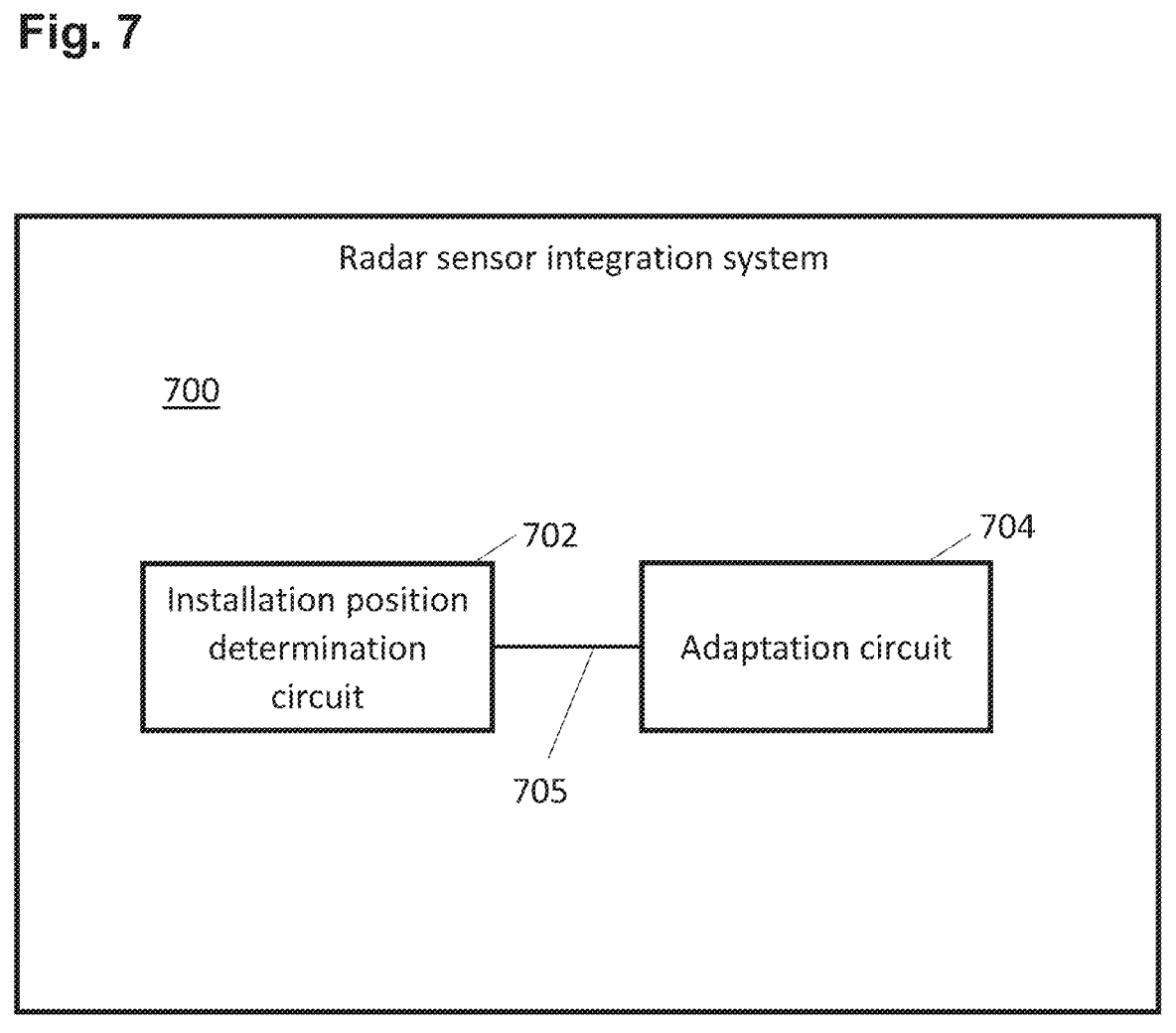
Figure 8:
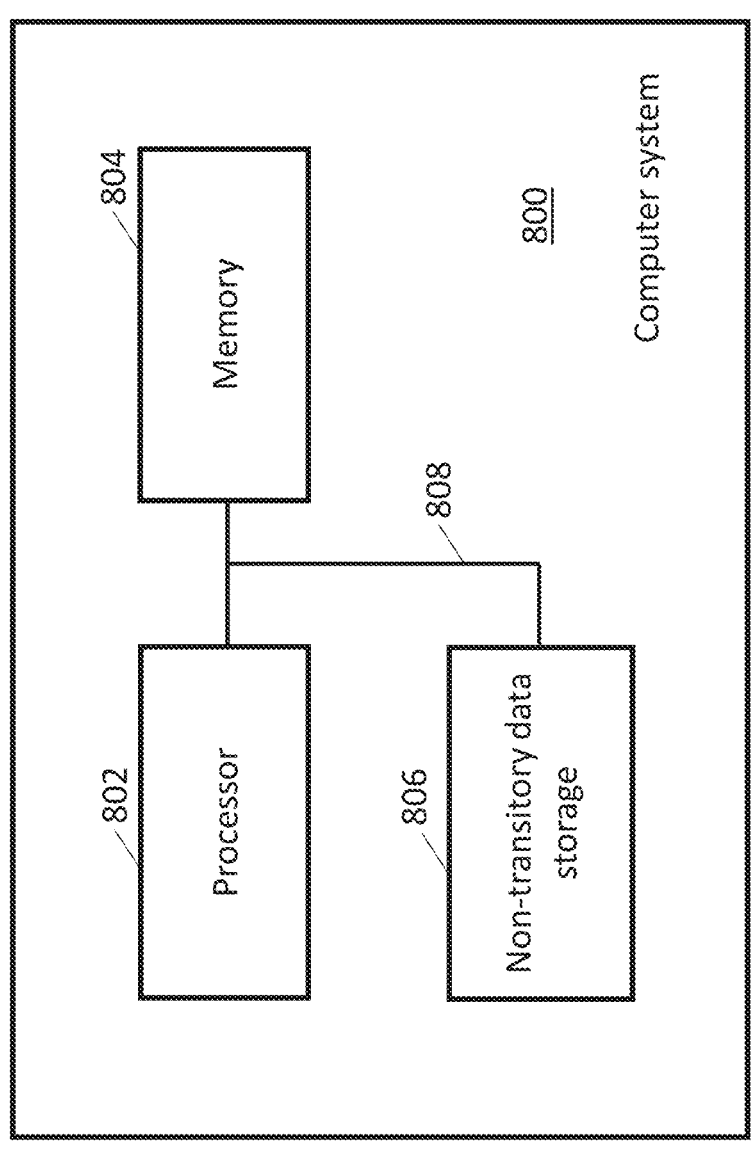

FIGS. 3A and 3B depict a vehicle door in which the radar sensor shown in FIG. 1 is integrated, FIG. 4 depicts the radar sensor of FIG. 1 located behind a bumper of the vehicle, FIG. 5 depicts another embodiment of the radar sensor, FIG. 6 depicts a flow diagram illustrating a method for integrating a radar sensor in a vehicle according to various embodiments, FIG. 7 depicts a radar sensor integration system according to various embodiments, and FIG. 8 depicts a computer system including computer hardware components configured to carry out steps of a computer implemented method for integrating a radar sensor in a vehicle according to various embodiments.

DETAILED DESCRIPTION

FIG. 1 depicts a radar sensor 100 which is integrated in a vehicle. The radar sensor 100 includes a radar transmit and receive unit 110 and an interface unit 120 which is attached to the radar transmit and receive unit 110. The radar sensor 100 further includes a housing 130.

In FIG. 1, portions 140 of a vehicle body are also depicted at which the radar sensor 100 is mounted by fixtures 141. In detail, the radar transmit and receive unit 110 includes a printed circuit board 111 which is provided with molded antennas in order to transmit radar waves through the interface unit 120 to an exterior environment of the vehicle and to receive radar waves from the external environment. The fixtures 141 extend through the printed circuit board 111, for example, for mounting the radar sensor at the portion 140 of the vehicle body.

The radar transmit and receive unit 110 further includes a monolithic microwave integrated circuit (MMIC) 112 which generates transmit signals TX1, TX2, TX3 for transmitting radar waves via the molded antennas of the printed circuit board 111, and receive signals RX1, RX2, RX3, RX4 from receiving radar waves which are detected by further molded antennas of the printed circuit board 111. In the present example, each pair of a transmit signal TX and a receive signal RX constitutes a radar channel such that a multiple-input multiple-output (MIMO) radar system having twelve channels is generated. In addition, the radar transmit and receive unit 110 includes a multilayer 113 which is configured to be a holder for the MMIC 112 and the printed circuit board 111, and to provide further electrical and electronic functions for operating the radar sensor 100.

The interface unit 120 is positioned in a cutout or opening defined by the portions 140 of the vehicle body (see also the opening 143 in FIG. 3B). As such, the interface unit 120 is adjusted regarding its shape or spatial form to a desired or specific position at the vehicle body at which the radar sensor 100 is to be integrated.

Although the portions 140 of the vehicle body and the interface unit 120 are depicted as parts having a plane outer surface and without any internal structures, the portions 140 of the vehicle body and the interface unit 120 may include a curvature such that the curvature of the interface unit 120 is adjusted to a corresponding curvature of the portions 140 of the vehicle body. By this means, a smooth and conformal outer appearance of the vehicle body will occur.

The portion 140 of the vehicle body and an outer surface of the interface unit 120 are covered by coating and painting layers 150 which include an outer transparent or clear coat layer 151, a paint layer 152 and a primer layer 153. By applying these layers on the portions 140 of the vehicle body and on the outer surface of the interface unit 120, a conformal and smooth outer surface of the vehicle body is generated at the installation position of the radar sensor 100. Therefore, the radar sensor 100 is not visible from outside the vehicle.

The interface unit 120 replaces a radome and a part of the fascia which are usually provided with radar sensors integrated in a vehicle. Due to this, the radar sensor 100 is located close to the outer surface of the vehicle. In other words, the distance between the printed circuit board 111 including the molded antennas and the exterior of the vehicle is reduced due to the interface unit 120 in comparison to the conventional installation of radar systems within a vehicle. Therefore, multiple reflections of transmitted radar waves are suppressed.

The interface unit 120 is further adjusted to desired characteristics of the transmitted and received radar waves. In detail, impedance matching is performed by the interface unit 120, i.e. by its dielectric properties. In addition, an internal structure of the interface unit may be used in order to design the radiation pattern of the radar waves transmitted by the radar sensor 100.

This is depicted in detail in FIG. 2. In FIG. 2A, an interface unit 120 is depicted which includes a single dielectric structure. Although the interface unit 120 is shown in FIG. 2A as having a rectangular form, the shape of this interface unit 120 having the single dielectric structure can be adjusted to a predetermined installation position at the vehicle such that a certain impedance and pattern characteristic is achieved, e.g. by selecting a suitable thickness of the interface unit 120.

In contrast, the interface unit 120 as shown in FIG. 2B has a multilayer structure including, in this specific example, three different layers 121, 122, 123. The layers 121, 122, 123 each have a different respective dielectric permittivity $\varepsilon_{r1}$, $\varepsilon_{r2}$ and $\varepsilon_{r3}$, respectively. The second layer 122 is arranged between the first layer 121 and the third layer. Therefore, the second layer 122 is also denoted as an interface layer 122. In addition to the difference regarding dielectric permittivity, a boundary or transition 124 between the first layer 121 and the interface layer 122 is designed such that features, in this case protrusions 125, are part of the interface layer 122 and extend into the first layer 121. The protrusions 125 have different length or extensions, e.g. L1 and L2, along the interface layer 122.

The design of the transition 124 between the first layer 121 and second layer 122, e.g. regarding the geometrical shape and the change of dielectric permittivity, and the design of a similar transition between the second layer 122 and the third layer 123 are made such that the radar waves are matched between the first layer 121 and the second layer 122 as well as between the second layer 122 and third layer 123. By this means, the pattern of the transmitted and received radar waves is matched and modified by the configuration of the layers 121, 122, 123, in other words throughout the interface unit 120, e.g. regarding thickness and dielectric permittivity, and by the shape of the interface layer 122 between the first and third layers 121, 123. That is, the pattern of the transmitted radar waves can be adjusted to a desired radiation pattern for the specific installation position of the radar sensor 100. Although three layers 121, 122, 123 are provided in this specific example as shown in FIG. 2B, a greater number of layers may be provided including a respective interface layer 122 between respective pairs of layers.

Similarly, FIG. 2C depicts an interface unit 120 comprising an outer layer 126 which surrounds a cavity 127 which is filled with air for the present example. By a specific design of the cavity 127, the pattern characteristic of the transmitted and received radar waves can also be designed in a suitable manner.

Therefore, by the internal structure of the interface unit 120, the spatial distribution of the dielectric permittivity may be designed in such a manner that an impedance matching is performed and desired patterns of the transmitted and received radar waves is achieved.

FIG. 3 depicts an example for integrating the radar sensor 100 as shown in FIG. 1 in a vehicle door 142. FIG. 3A shows a plan view of the vehicle door 142 which includes the interface unit 120 at a position within a lower part of the vehicle door 142. FIG. 3B depicts an exploded view of the radar sensor 100 and of the coating and painting layers 151, 152, 153 at the vehicle door 142.

The interface unit 120 is positioned in an opening 143 of the vehicle door 142 and attached to the radar transmit and receive unit 110 including the printed circuit board 111, the monolithic microwave integrated circuit (MMIC) 112 and the multilayer 113. On top of the outer surface of the interface unit 120 within the opening 143, the primer layer 153, the paint layer 152 and the transparent clear coat layer 151 are applied. Therefore, the radar sensor 100 is invisible from the outer side of the vehicle. Nevertheless, the interface unit 120 is shown at a specific position in FIG. 3A in order to illustrate a predetermined or desired installation position for the radar sensor 100 in form of the opening 143.

As such, the radar sensor 100 is not installed behind plastic components of the vehicle in the example as shown in FIG. 3, but it is integrated in a metallic part of the vehicle door 142. Hence, the flexibility for integrating the radar sensor 100 at desired positions within the vehicle is improved by configuring the interface unit 120 in a suitable manner.

FIG. 4 depicts another example for integrating the radar sensor 100 as shown in FIG. 1 in a vehicle. For this example, the radar sensor 100 is located behind a bumper 144 of the vehicle. The radar sensor 100 includes the radar transmit and receive unit 110 which is installed within the housing 130, and the interface unit 120 which is located between the radar transmit and receive unit 110 and the bumper 144.

Therefore, the interface unit 120 is also an interface between the bumper 144 and the molded antennas which are provided within the printed circuit board 111 (see FIG. 1). The shape of the interface unit 120, i.e. its outer surface facing away from the radar transmit and receive unit 110, is adapted to an inner surface of the bumper 144 such that the interface unit 120 is fully covered by the bumper 144.

For installing the radar sensor 100 behind the bumper 144 as shown FIG. 4, fastening elements similar to the fixtures 141 (see FIG. 1) and/or adhesive layers are required. The internal properties of interface unit 120 as shown FIG. 4, e.g. the dielectric properties of one or more layers of the interface unit 120, are also designed to achieve the desired characteristics of the transmitted and received radar waves like a desired radiation pattern, i.e. in a similar manner as described above in context of FIG. 2. Moreover, the impact of the interface unit 120 on the transmitted and received radar waves can be simulated and corrected, if required, by a suitable software algorithm.

FIG. 5 depicts a further embodiment of the radar sensor 100 which includes the radar transmit and receive unit 110 as shown in FIG. 1, and a radome 128 which is located on top of the radar transmit and receive unit 110. That is, the radome 128 constitutes the interface unit 120 being attached to the radar transmit and receive unit 110. In detail, a conventional radome 128 may be modified in order to provide the properties of the interface unit 120 as described above.

The radome 128 is covered by the coating and painting layers 150. As depicted in the enlarged section in the lower part of FIG. 4, the primer layer 153, the paint layer 152 and the clear coat layer 151 are applied on top of the radome 128.

Furthermore, the table of FIG. 4 provides a specific example for the thickness th in μm, the dielectric permittivity $\varepsilon_r$ and the loss factor tan δ for each of the three layers 151, 152, 153. In a design phase of the vehicle, the properties of the layers 151, 152, 153 may be defined as shown in the table of FIG. 4, for example, and the internal structure of the radome 128 and/or the interface unit 120 as shown in FIG. 2 are provided thereafter in order to achieve desired characteristics of the transmitted and received radar waves of the radar sensor 100.

In addition, the properties of the layers 151, 152, 153 as shown in the table of FIG. 4 may be associated with specific tolerances which are related to the specific installation position at the vehicle. Therefore, the interface unit 120 has to be designed, e.g. regarding its internal structure, such that the desired characteristics of the transmitted and received radar waves can be achieved with respect to the predefined tolerances.

FIG. 6 shows a flow diagram 600 illustrating a method for integrating a radar sensor in a vehicle according to various embodiments, wherein the radar sensor may include a radar transmit and receive unit configured to transmit radar waves to an external environment of the vehicle and to receive radar waves from the external environment of the vehicle, and an interface unit being attached to the radar transmit and receive unit. At 602, a desired installation position of the radar sensor is determined at the vehicle. At 604, one or more design and/or material parameters of the interface unit is adjusted to fit the desired installation position with respect to desired characteristics of the transmitted and received radar waves.

According to various embodiments, determining the desired installation position of the radar sensor may include receiving data associated with a geometrical shape of the vehicle, simulating the transmitted radar waves for a plurality of candidate positions at the vehicle based on the received data, and selecting one of the candidate positions as the desired installation position for which a deviation between a radiation pattern of the simulated transmitted radar waves and a desired radiation pattern is minimized.

According to various embodiments, a radar sensor for a vehicle may comprise a radar transmit and receive unit configured to transmit radar waves to an external environment of the vehicle and to receive radar waves from the external environment of the vehicle, and an interface unit attached to the radar transmit and receive unit, wherein one or more design and/or material parameters of the interface unit may be adjusted to fit a predetermined installation position at the vehicle with respect to desired characteristics of the transmitted and received radar waves.

According to various embodiments, the design and/or material parameters of the interface unit may be configured to provide a desired radiation pattern for the transmitted and received radar waves.

According to various embodiments, the desired radiation pattern may include a coincidence of phase patterns associated with at least two elements of the radar transmit and receive unit.

According to various embodiments, the interface unit may include at least one layer, and a thickness and/or dielectric properties of each of the at least one layer may be adjusted to provide the desired radiation pattern for the transmitted and received radar waves.

According to various embodiments, the interface unit may include at least two layers, each of the layers having different dielectric properties.

According to various embodiments, the at least two layers may include an interface layer which may be located between two other layers, and a shape and/or dielectric properties of the interface layer may be configured to provide the desired radiation pattern for the transmitted and received radar waves.

According to various embodiments, the interface unit may include at least one cavity in order to provide the desired radiation pattern for the transmitted and received radar waves.

According to various embodiments, a shape of the interface unit may be adjusted to the desired installation position at the vehicle with respect to desired characteristics of the transmitted and received radar waves.

According to various embodiments, the radar transmit and receive unit may include a printed circuit board including a plurality of molded antennas for transmitting and receiving radar waves, and the interface unit may be located adjacent to the printed circuit board.

According to various embodiments, a vehicle may comprise at least one radar sensor as described above.

According to various embodiments, the at least one radar sensor may be located in an opening at an outer surface of the vehicle.

According to various embodiments, the at least one radar sensor may be located behind a bumper of the vehicle.

According to various embodiments, the vehicle may comprise at least one coating layer and at least one painting layer covering the interface unit, and the interface unit may be further adjusted to respective spatial and dielectric characteristics of the at least one coating layer and of the at least one painting layer at the predetermined position of the radar sensor.

FIG. 7 shows a radar sensor integration system 700 according to various embodiments. The radar sensor integration system 700 may include an installation position determination circuit 702 and an adjustment circuit 704.

The installation position determination circuit 702 may be configured to determine a desired installation position of the radar sensor at the vehicle. The adjustment circuit 704 may be configured to adjust the interface unit to fit the desired installation position with respect to desired characteristics of the transmitted and received radar waves.

The installation position determination circuit 702 and the adjustment circuit 704 may be coupled to each other, e.g. via an electrical connection 705, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

FIG. 8 shows a computer system 800 with a plurality of computer hardware components configured to carry out steps of a computer implemented method for integrating a radar sensor in a vehicle according to various embodiments. The computer system 800 may include a processor 802, a memory 804, and a non-transitory data storage 806.

The processor 802 may carry out instructions provided in the memory 804. The non-transitory data storage 806 may store a computer program, including the instructions that may be transferred to the memory 804 and then executed by the processor 802.

The processor 802, the memory 804, and the non-transitory data storage 806 may be coupled with each other, e.g. via an electrical connection 808, such as e.g. a cable or a computer bus or via any other suitable electrical connection to exchange electrical signals.

As such, the processor 802, the memory 804 and the non-transitory data storage 806 may represent the installation position determination circuit 702 and the adjustment circuit 704 as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the radar sensor integration system 700 and/or for the computer system 800.

REFERENCE NUMERAL LIST 100 radar sensor
110 radar transmit and receive unit
111 printed circuit board
112 monolithic microwave integrated circuit
113 multilayer
120 interface unit
121 first layer
122 second or interface layer
123 third layer
124 boundary or transition
125 protrusion
126 outer layer
127 cavity
128 radome
130 housing
140 portion of a vehicle body
141 fixture
142 vehicle door
143 opening
144 bumper
150 coating and painting layers
151 clear coating layer
152 paint layer
153 primer layer
600 flow diagram illustrating a method for integrating a radar sensor in a vehicle
602 step of determining a desired installation position of the radar sensor at the vehicle
604 step of adjusting one or more design and/or material parameters of an interface unit to fit the desired installation position with respect to desired characteristics of the transmitted and received radar waves
700 radar sensor integration system
702 installation position determination circuit
704 adjustment circuit
705 connection
800 computer system
802 processor
804 memory
806 non-transitory data storage
808 connection

The invention claimed is:

1. A radar sensor for a vehicle, comprising:
a radar transmit and receive unit configured to transmit radar waves to an external environment of the vehicle and to receive radar waves from the external environment of the vehicle, and
an interface unit attached to the radar transmit and receive unit, wherein one or more design and/or material parameters of the interface unit are adjusted to fit a predetermined installation position at the vehicle with respect to desired characteristics of the transmitted and received radar waves
wherein the one or more design and/or material parameters of the interface unit are configured to provide a desired radiation pattern for the transmitted and received radar waves, the interface unit replaces a radome, and an outer surface of the interface unit is adjusted to an outer surface of the vehicle.

2. The radar sensor according to claim 1, wherein the desired radiation pattern includes a coincidence of phase patterns associated with at least two elements of the radar transmit and receive unit.

3. The radar sensor according to claim 1, wherein
the interface unit includes at least one layer, and
a thickness and/or dielectric properties of each of the at least one layer are adjusted to provide the desired radiation pattern for the transmitted and received radar waves.

4. The radar sensor according to claim 1, wherein
the interface unit includes at least two layers, each having different dielectric properties.

5. The radar sensor according to claim 4, wherein
the at least two layers include an interface layer which is located between two other layers, and
a shape and/or dielectric properties of the interface layer are configured to provide the desired radiation pattern for the transmitted and received radar waves.

6. The radar sensor according to claim 1, wherein
the interface unit includes at least one cavity in order to provide the desired radiation pattern for the transmitted and received radar waves.

7. The radar sensor according to claim 1, wherein
a shape of the interface unit is adjusted to the desired installation position at the vehicle with respect to desired characteristics of the transmitted and received radar waves.

8. A vehicle comprising at least one radar sensor according to claim 1.

9. The vehicle according to claim 8, wherein
the at least one radar sensor is located in an opening at an outer surface of the vehicle.

10. The vehicle according to claim 8, wherein
the at least one radar sensor is located behind a bumper of the vehicle.

11. A computer implemented method for integrating a radar sensor in a vehicle, wherein the radar sensor includes a radar transmit and receive unit configured to transmit radar waves to an external environment of the vehicle and to receive radar waves from the external environment of the vehicle, and an interface unit being attached to the radar transmit and receive unit, the method comprising:

determining a desired installation position of the radar sensor at the vehicle, and adjusting one or more design and/or material parameters of the interface unit to the desired installation position with respect to desired characteristics of the transmitted and received radar waves, wherein determining the desired installation position of the radar sensor includes:

receiving data associated with a geometrical shape of the vehicle, simulating the transmitted radar waves for a plurality of candidate positions at the vehicle based on the received data, and selecting one of the candidate positions as the desired installation position for which a deviation between a radiation pattern of the simulated transmitted radar waves and a desired radiation pattern is minimized.

12. The computer system being configured to carry out the computer implemented method of claim 11.

13. The non-transitory computer readable medium comprising instructions for carrying out the computer implemented method of claim 11.

\*  \*  \*  \*  \*